United States Patent [19]

Kashima et al.

[11] 4,240,021
[45] Dec. 16, 1980

[54] SOLAR CELL BATTERY CHARGING CONTROL SYSTEM

[75] Inventors: Yoshinobu Kashima, Tanashi; Makoto Yoshida, Tokorozawa, both of Japan

[73] Assignee: Citizen Watch Co., Ltd., Tokyo, Japan

[21] Appl. No.: 905,615

[22] Filed: May 12, 1978

[30] Foreign Application Priority Data

| May 20, 1977 | [JP] | Japan | 52-57652 |
| Jul. 29, 1977 | [JP] | Japan | 52-90986 |
| Sep. 16, 1977 | [JP] | Japan | 52-111370 |
| Dec. 22, 1977 | [JP] | Japan | 52-153609 |

[51] Int. Cl.³ .................... H02J 7/00; H01L 31/00
[52] U.S. Cl. .................... 320/2; 136/291; 320/39; 323/15; 368/62

[58] Field of Search .................... 320/2, 35, 39, 40; 323/15; 350/331; 136/89 AC; 58/23 BA, 23 C

[56] References Cited

U.S. PATENT DOCUMENTS

| 3,509,712 | 5/1970 | Grohoski | 58/23 C |
| 3,740,636 | 6/1973 | Hogrefe et al. | 320/2 |
| 4,023,088 | 5/1977 | Fowler | 350/331 X |

Primary Examiner—Robert J. Hickey
Attorney, Agent, or Firm—Jordan and Hamburg

[57] ABSTRACT

A solar cell battery charging control system having a storage battery and a plurality of solar cells connected in series for charging the storage battery, which system comprises a heavy load means adapted to be driven by the storage battery to discharge the storage battery for thereby preventing overcharging of the storage battery when a battery charge level exceeds a predetermined value.

8 Claims, 16 Drawing Figures

SOLAR CELL BATTERY CHARGING CONTROL SYSTEM

This invention relates to battery charging devices, and, more particularly, to a battery charging device whereby a storage battery charged from a solar cell array is maintained at an optimum charge level.

In recent years, solar cells have come into wide use as a source of power for charging storage batteries, in such widely different fields as artificial satellites, unmanned installations such as lighthouses in remote locations, and in portable electronic devices such as wristwatches. Nickel cadmium, mercury, or silver oxide types of storage batteries can be used in such applications. In certain of these applications of solar cell battery charging, and in particular in the case of electronic wristwatches, both charging of the storage battery from the solar cells and discharging of the battery into a load can take place simultaneously. This is sometimes referred to as "floating" type battery charging. When this charging method is adopted, and if the solar cells are exposed to a strong source of illumination for a long period of time while the battery is close to the optimum charge level, then it is possible for overcharging of the storage battery to occur. When overcharging occurs, then gases may be generated within the storage battery, causing swelling of the battery. This condition, particularly if it is frequently repeated, can lead to a significant reduction of the usable lifetime of the storage battery. This is especially true in the case of the miniaturized storage batteries used in electronic watches employing solar cell charging.

To attempt to alleviate this problem, designers of electronic wristwatches employing solar cell charging have hitherto attempted to establish an optimum number of solar cells connected in series to constitute a solar cell array for charging purposes, this number being selected such as to minimize the possibility of overcharging as far as possible. However, since this inevitably results in a reduction of the number of solar cells used, below the maximum possible number, this method presents the disadvantage that rapid charging of the storage battery cannot take place when the solar cells are exposed to illumination for a short period of time with the battery in a low state of charge. Another method which is adopted to attempt to reduce the possibility of overcharging is to insert a resistor of relatively high value between the solar cells and the storage battery, to limit the amount of charging current that can be supplied by the solar cells. Such a resistor is usually called a limiting resistor. This method too, however, also presents the same disadvantage as the first method described above, namely that the storage battery cannot be rapidly charged by the solar cells when the battery is in a low state of charge. It will be apparent also, that with the two methods of the prior art described above, if the solar cells are exposed to only a low level of illumination for an extended period of time, then it will become possible for the rate of charging of the storage battery to actually fall below the rate of discharge, so that the storage battery could eventually become unusable due to insufficient voltage being provided.

With the method of the present invention for maintaining a storage battery at an optimum level of charge by charging from solar cells, the disadvantages of the prior art methods described above are completely eliminated. With the present invention, if the output voltage of the storage battery should rise above the predetermined optimum level (corresponding to the optimum state of charge of the battery and the correct voltage for operation of the circuit components powered by the battery), then this fact is detected by a voltage detection circuit. The voltage detection circuit output signal then acts to control another circuit which serves to prevent the battery from entering an overcharged state. In one method in accordance with the present invention, this is done by causing a relatively heavy load such as a lamp or a stepping motor winding to be applied to the storage battery for a predetermined period of time. The battery voltage is again checked by the voltage detection circuit at the end of this predetermined period of time, and if the battery voltage has reached or fallen below the optimum charge level, then the heavy load is automatically disconnected from the battery. With another method in accordance with the present invention, when a rise of the battery voltage above the optimum charge level is detected by the voltage detection circuit, then the amount of light reaching all or part of the solar cells is reduced or cut off. This is done by passing light to one or more of the solar cells used to through a window comprising a liquid crystal cell. This liquid crystal cell serves as a light control valve, and is actuated by voltages applied to its electrodes to control the amount of light falling upon one or more of the solar cells, thereby reducing the photoelectric voltage generated by the cell. Since the voltage applied to the electrodes of this liquid crystal cell is controlled by the output of the voltage detection circuit, overcharging of the storage battery can be prevented.

It is also possible to use a combination of both of the methods of the present invention described above.

It is therefore an object of the present invention to provide improved means of charging a storage battery from solar cells.

It is another object of the present invention to provide improved means of charging a storage battery from solar cells whereby overcharging of said storage battery is prevented.

It is a further object or the present invention to provide improved means of charging a storage battery from solar cells whereby said charging is performed rapidly when said battery is in a low state of charge and said solar cells are exposed to a high level of illumination.

It is a further object of the present invention to provide improved means for charging a storage battery from solar cells whereby said charging is performed at a rate which is close to the maximum possible rate when said battery is in a low state of charge and said solar cells are exposed to a relatively low level of illumination.

Other objects, features and advantages of the present invention will be more apparent from the following description when taken in conjunction with the accompanying drawings, wherein.

Figure 1:
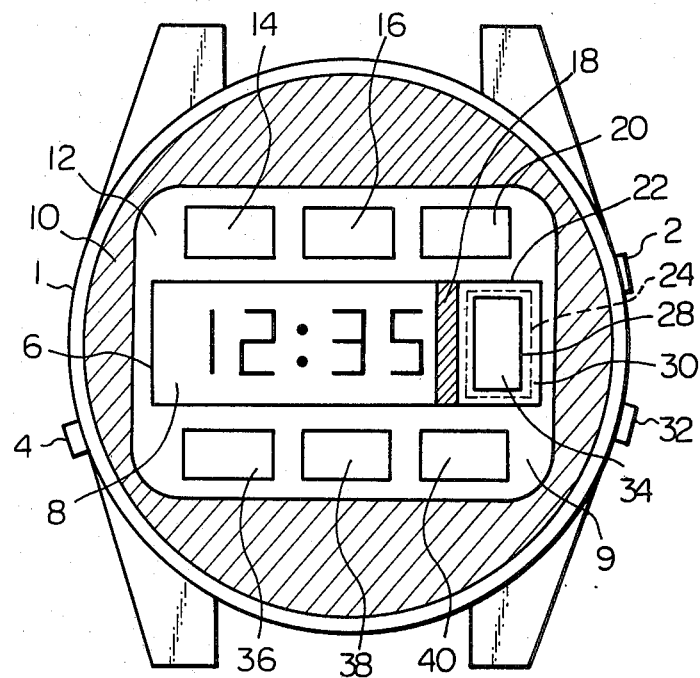
FIG. 1 is a plan view of the face of a solar cell powered wristwatch in accordance with a first embodiment of the present invention.

Referring now to the diagrams, FIG. 1 shows a plan view of a solar cell powered wristwatch constituting a first embodiment of the present invention. Numeral 1 indicates the watch case, to which is attached a cover glass 12. An area 10 on the surface of cover glass 12 is made opaque by painting or other means, so as to leave only a required area of the face of the watch visible. Numeral 2 indicates a pushbutton which is used to select the seconds, minutes, hours, days or months of time information of correction purposes. Such correction of time information is performed by means of time correction pushbutton 32. Pushbutton 4 is used to actuate a built-in lamp whereby the face of the wristwatch is illuminated, when there is insufficient ambient light to read the time display. Numerals 14, 16, 20, 36, 38 and 40 indicate solar cells, which are connected in series to charge a storage battery. Another solar cell, 34, is also connected in series with the aforesaid solar cells, and is used to control the charging of the storage battery, by a method to be described hereinafter in relation to a second embodiment of the present invention. Numeral 25 indicates a liquid crystal cell which functions as a light control valve to control the light applied to solar cell 34, as described in relation to said second embodiment of the present invention. Numeral 30 indicates a reflector plate, having an aperture 28 therein to allow light to pass to said solar cell 34. Numeral 6 indicates a liquid crystal cell which serves to provide a display of time information.

Figure 2:
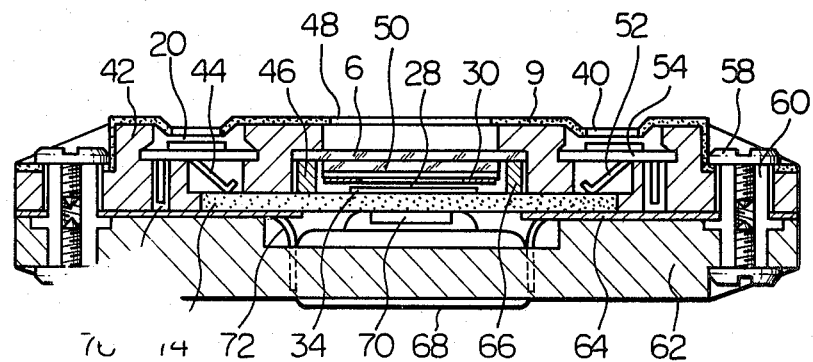
FIG. 2 is a sectional view in elevation of the wristwatch shown in FIG. 1.

Referring now to FIG. 2, which shows a cross-sectional view through the wristwatch shown in FIG. 1, numeral 42 indicates an upper body member, which can be made of a material such as plastic. Numeral 62 indicates a back plate, which can be of similar material. Apertures such as 48 are provided in a masking plate 9 so as to expose liquid crystal cells 6 and 22, and solar cells 14, 16, 20, 36, 38 and 40. Numeral 74 indicates the substrate of a timekeeping circuit, to which the electrodes of liquid crystal cells 6 and 22 are connected by means of alternate layers of conductive and non-conductive rubber, indicated by numerals 46 and 66 for the case of liquid crystal cell 22. Numeral 54 indicates a solar cell substrate for solar cell 40, which is connected to the timekeeping circuit substrate by means of a contact spring 52. The solar cell substrates are held in position by means of pins such as pin 76 used for the substrate of solar cell 20. Conductive rubber connectors 46 and 66, and contact springs such as contact spring 52 provide contact to a printed wiring pattern provided upon the surface of timekeeping circuit substrate 74, which is not shown in the figures. It is also possible to use contact members made of flexible conductive rubber in place of contact springs.

Numeral 70 indicates an integrated circuit chip, arranged beneath the timekeeping circuit substrate, said integrated circuit chip containing timekeeping and battery charging control functions of the wristwatch. A storage battery, 68, is held in place by a spring member of circular cross-section, which also serves to strengthen timekeeping circuit substrate 74. Numeral 64 indicates a metal plate. A central aperture is provided in back plate 62 which serves to accommodate storage battery 68. This back plate 62 also serves to support other components which are not shown in the figure, and to cover the rear of the movement. Numeral 60 indicates tubes which are inserted in base plate 62 and upper body member 42 and are fixed in position by means of screws 58, so as to hold metal plate 64, base plate 62, masking plate 9, etc., in position.

Figure 3:
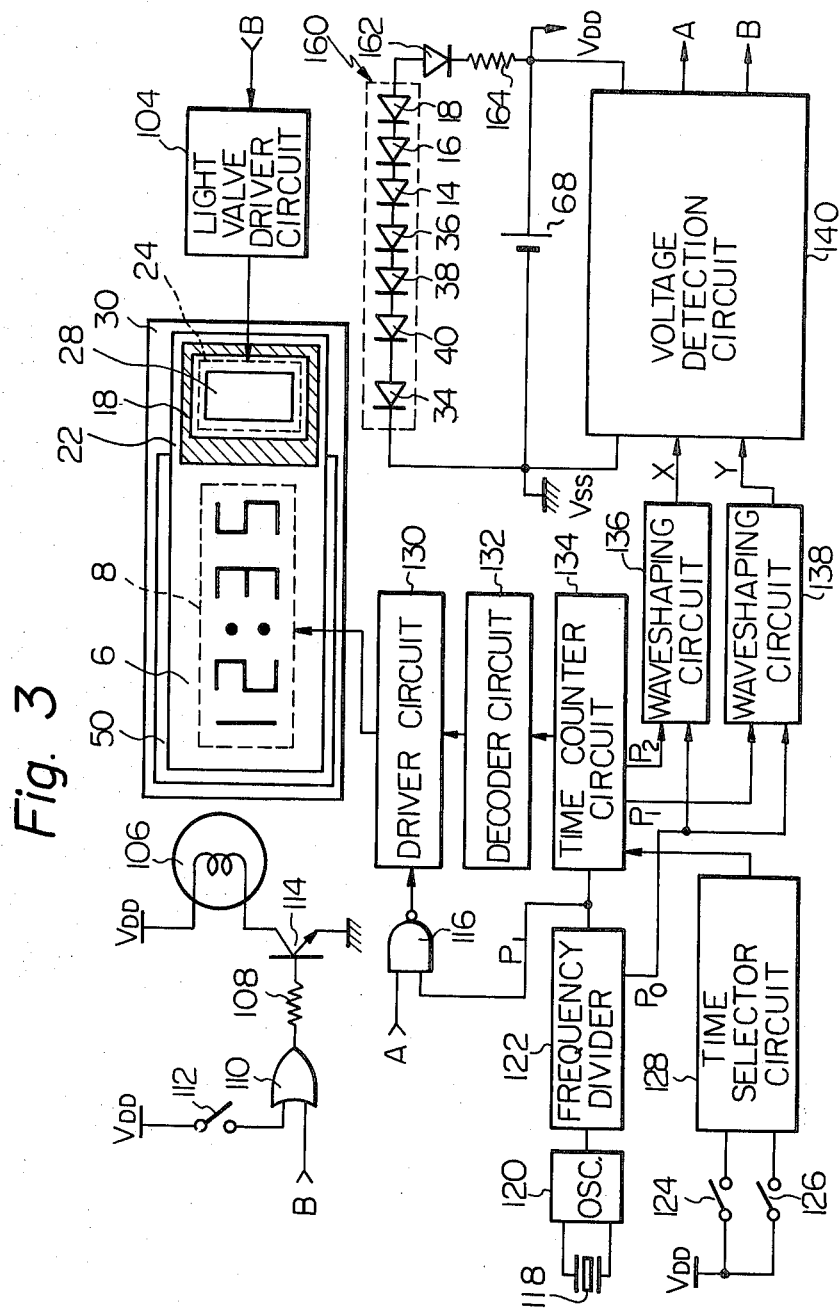
FIG. 3 is a general block diagram illustrating the circuit of the wristwatch shown in FIG. 1.

Referring now to FIG. 3, a general diagram is given therein of the circuitry of the first embodiment of FIGS. 1 and 2. Numeral 118 indicates a quartz crystal oscillator which is connected to an oscillator circuit 120, to produce a standard frequency signal of 32768 Hz. This signal is applied to a frequency divider 122, which generates a final output signal Po at a frequency of 1 Hz, and an intermediate output signal P1 of frequency 64 Hz. Output signal P1 is applied to a time counter circuit 134, which serves to count the minutes, hours, days and months of time information. The time information output of circuit 134 is applied to a decoder circuit 132, the output of which is applied to a liquid crystal driver circuit 130 which drives the time display section 8 of liquid crystal cell 6. The output signal P1 from frequency divider circuit 122 is also applied to an input of a NAND gate 116, to which a signal A is also input. Signal A will be described later, but when it is at the "1" logic lever, then the output of NAND gate 116 causes liquid crystal driver circuit 130 to provide flashing of the time display on and off, at a rate of one cycle per second. When signal A is at the "0" logic level, then the normal display of time is performed. Numeral 124 indicates a switch which is coupled to pushbutton 2, and serves to select correction of time information by applying a signal of level $V_{dd}$ to an input of a time selector circuit 128. A second switch 126 is coupled to pushbutton 32, and is used to perform correction of time information. The output of time selector circuit 128 is applied to time counter circuit 134. Output Po from frequency divider 122, at a frequency of 64 Hz, is applied to inputs of waveshaping circuits 136 and 138. A signal from time counter 134, with a period of 1 second is applied to another input of waveshaping circuit 136, which produces an output X with a period of one minute and a pulse width of 1/64 seconds. A signal P2 with a period of 5 is applied to another input of waveshaping circuit 138, which produces an output signal Y with a period of 5 minutes and a pulse width of 1/64 seconds. Signals X and Y are applied to a voltage detection circuit 140, which is powered by the output voltage of storage battery 68 charged by solar cell array 160, which is composed of solar cells 34, 40, 38, 36, 14, 16 and 18 shown in FIG. 1. A reverse current prevention diode 162 and a current limiting resistor 164 are connected in series with the charging circuit of solar cell array 160 and battery 68.

Output B of voltage detection circuit 140 is connected to an input of OR gate 110. A switch 112 which is coupled to lamp illumination pushbutton 4 is connected to another input of OR gate 110. A current limiting resistor 108 is connected in series between the output of OR gate 110 and the base of transistor 114, which serves to pass a current through an illumination lamp 106 when a current is passed into its base. Thus, when either the illumination pushbutton 4 is depressed or signal B goes to the H logic level, the illumination lamp 106 is turned on. When voltage detection circuit 140 detects that the voltage of storage battery 68 has gone above a first predetermined level, then output B goes to the H logic level. As a result, lamp 106 is turned on, as explained above, thereby applying a heavy load to storage battery 68. Due to the current drawn by this heavy load, the battery voltage will start to drop, and when it has dropped below said first predetermined level, then signal B goes back to the 0 logic level. If the battery voltage should fall below a second predetermined voltage level, which is lower than the first predetermined level, then signal A goes from the 0 logic level to the 1 level. Thus, as explained above, flashing of time display section 8 is performed, thereby warning the user that the battery is at a low state of charge. Thus, overcharging of battery 68 by solar cell array 160 is prevented by means of signal B, and a warning of excessively low battery voltage is provided by means of signal A. Signal B is also applied to a light valve driver circuit 104 to drive a section 22 of liquid crystal cell 6, section 22 acting as a light control valve to control the level of light falling upon solar cell 34. Thus, when signal B goes to the "1" logic level the light applied to solar cell 34 is sharply reduced by the action of the light control valve, thereby reducing the current for charging battery 68 from solar cell array 160, since solar cell 34 is connected in series with all of the other solar cells of array 160. This represents another method of preventing overcharging of the storage battery, which will be explained in much greater detail in a description of a second embodiment of the present invention given hereinafter.

Figure 5:
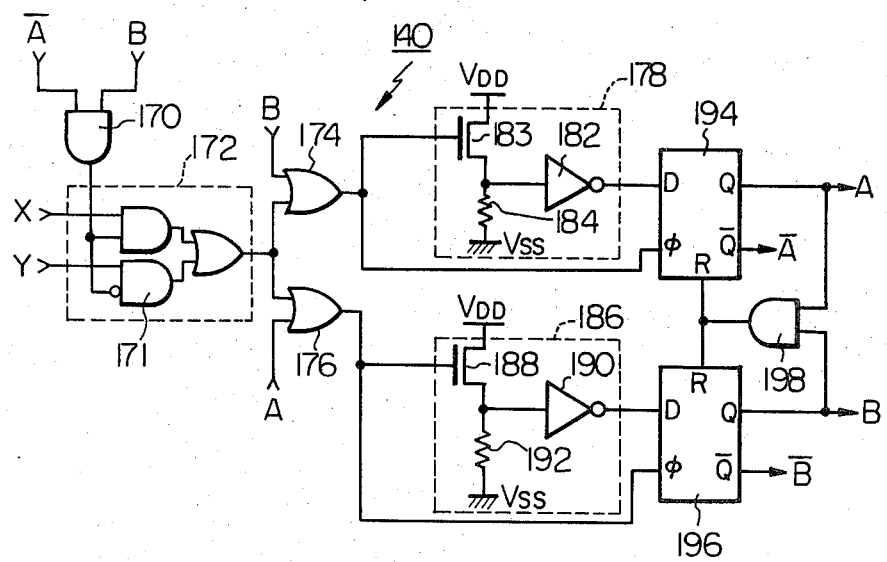
FIG. 5 is a general circuit diagram of one of the blocks shown in FIG. 3, which performs a detection function with respect to battery voltage.

Referring now to FIG. 5, a description is given therein of circuitry for voltage detection circuit 140 of FIG. 3. Numeral 172 indicates a selector circuit, whereby either signal X or signal Y is selected to be applied to OR gates 174 and 176 in accordance with the states of output signals A and B. Circuit 178 is a voltage detection circuit, to which the output of OR gate 174 is input. Circuit 178 comprises a variable resistor 184, connected to the drain terminal of a PMOS transistor 180 and to the input of an inverter 182. The output signal from OR gate 174 consists of pulses, which serve as a sampling signal to detect whether the voltage of battery 68, i.e. voltage Vdd, is below a certain level (referred to above as the second predetermined level). If the voltage across resistor 184 is below this level, which can be 1.35 V for example, during a sampling pulse, this is detected and causes the output of inverter 182 to go to the "H" logic level. Since the sampling pulse is also applied to the clock terminal of a data-type flip-flop 194, the Q output of 194 goes to the H logic level, i.e., output signal A goes to the "H" logic level. Circuit 186 is also a voltage detection circuit. In this case, if the battery voltage rises above a level which corresponds to a state of overcharge, such as 1.8 V, for example, then by a simiilar process as described for voltage detection circuit 178, the Q output of data-type flip-flop 196 goes to the "1" logic level, i.e. output B goes to the "1" level. When output B is at the "H" level, it serves to inhibit the supply of sampling pulses to detection circuit 178, since it is connected to an input of OR gate 174. Similarly, when signal A is at the "H" level, it inhibits the supply of sampling pulses to circuit 186 by means of the input to OR gate 176. Also, by means of the connection of A and B to AND gate 170, if both signals A and B are at the "O" logic level, then the sampling pulses which are output from selector circuit 172 consist of signal Y. This is due to the inverted input of the output from AND gate 170 to AND gate 171. If output B goes to the "H" level, then signal X, which consists of pulses with a very low repetition rate, are selected as sampling pulses. This permits sufficient time between sampling pulses for the battery to recover from a state of overcharge, by being discharged into the heavy load constituted by lamp 106. AND gate 198 provides an output signal which resets flip-flops 194 and 196 if both signal A and signal B are at the "1" logic level. Such a condition can occur when a storage battery is first inserted in the wristwatch, for example.

Figure 4:
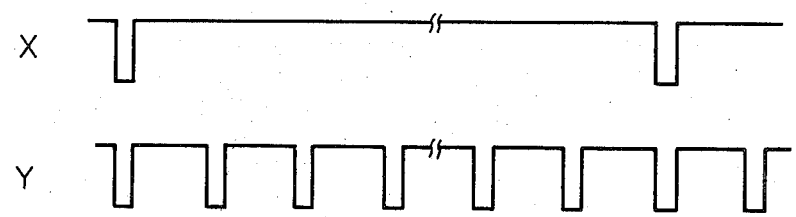
FIG. 4 is a waveform diagram showing the waveforms of two signals used to perform a sampling function in the circuit of FIG. 3.

From the above description of the first embodiment of the present invention, it can be understood that the battery voltage is sampled periodically by means of sampling pulses of low duty cycle. If the battery voltage should rise above a first predetermined value then a heavy load, consisting of a lamp which is also used for illumination of the timepiece dial when required, is applied to the battery. Sampling of the battery voltage is continued in this condition, but with sampling signals of extremely low duty cycle, corresponding to signal X shown in FIG. 4. If the battery voltage has not fallen below the first predetermined level between the time of application of the heavy load and the occurrence of the next X signal sampling pulse, then discharge of the battery into the heavy load is continued for another period of the X signal sampling pulses. If, when the next sampling pulse subsequently occurs, the battery voltage has fallen below the first predetermined level, then the heavy load is removed from the battery and detection of the battery voltage by means of the signal Y sampling pulses is resumed. If the battery voltage should fall below a second predetermined level, corresponding to a state of abnormally low charge, then the time information display of the wristwatch is caused to flash on and off periodically, although the time information is still displayed normally during the on periods. In this case, sampling continues to be performed by means of Y signal sampling pulses after detection of low battery voltage has occurred. When the battery voltage again rises above the second predetermined level, for example by the user of the wristwatch exposing the face of the watch to a source of light for a period of time in response to the flashing warning of the time display, then the display flashing is discontinued.

Figure 6:
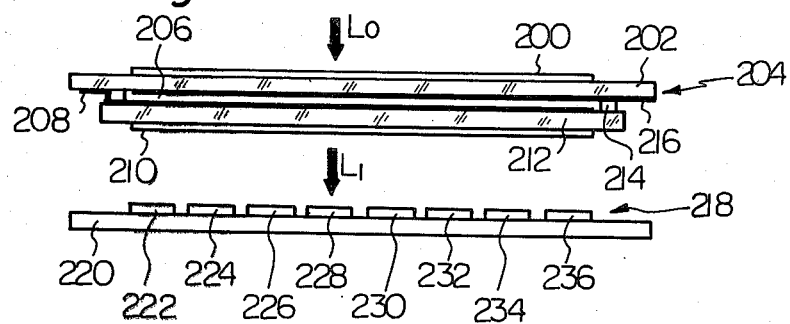
FIG. 6 is a general view in cross-sectional elevation of a light control valve and solar cell array for a solar cell powered wristwatch in accordance with the present invention.
Figure 7:
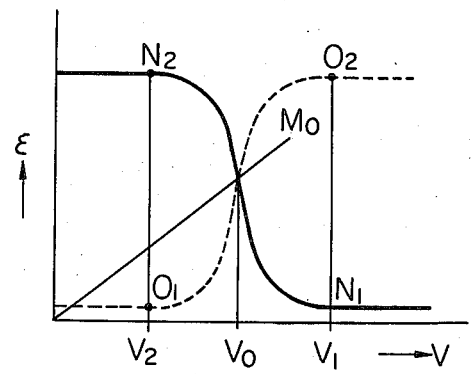
FIG. 7 is a graph illustrating the relation between the transparency factor of a liquid crystal cell used as a light control valve and the voltage applied to the terminals of the liquid crystal cell.
Figure 8:
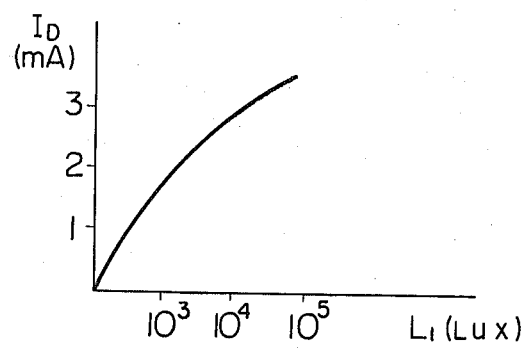
FIG. 8 is a graph illustrating the relation between the level of light incident upon a solar cell array and the photoelectric current produced by the solar cell array.

A second embodiment of the present invention will now be described, referring first to FIG. 6. This is a cross-sectional view illustrating the construction of liquid crystal cell 204 which functions as a light control valve to pass a level of light L1 to a solar cell array 218, when the surface of liquid crystal cell 20 receives a level of incident light L0. Numeral 200 indicates a first polarizing plate, 200 is a first glass plate, and transparent electrode 216 is deposited on the lower surface of glass plate 200. Both the lower surface of glass plate 200 and the outer surface of transparent electrode 216 are treated with an alignment processing film, which serves to align the molecules of a liquid crystal material described hereafter in a desired direction. Numeral 215 indicates a second glass plate, on which is deposited a transparent electrode 208. The surfaces of both 215 and electrode 208 are coated with an alignment processing film, as described above. Numeral 210 indicates a second polarizing plate. A twisted nematic liquid crystal material 206 is continued between first and second glass plates 200 and 210 by means of a sealing material 214 provided at the periphery of the plates. An array of solar cells, 218, is arranged beneath liquid crystal cell 204. Solar cell array 218 comprises solar cell chips, 222, 224, 226, 228, 230, 232, 234 and 236, which are connected in series. The relationship between the level of light incident upon liquid crystal cell 204 and the level of light transmitted through the cell can be expressed as a transparency factor $\epsilon$, whose value is given by the equation $\epsilon = (L1/L0) \times 100[\%]$. The variation of with changes in the voltage V applied to the electrodes of the liquid crystal cell is shown in FIG. 7. The solid line curve shows the characteristic for the case of a liquid crystal cell in which the axes of polarization of the polarizing plates are mutually perpendicular, while the dotted line curve is for the case of the axes of polarization being parallel, or close to parallel. It can be seen that, for a range of applied voltages V centered upon a certain voltage value V0, variation of the applied voltage V causes a considerable change in the transparency factor. Thus, it is apparent that it is possible to control the level of light falling upon solar cell array 218 by varying the voltage applied to the electrodes of liquid crystal cell 204 shown in FIG. 6. In other words, it is possible to use liquid crystal cell 204 as a light control valve, and this can be used to control the photoelectric current generated by the solar cell array 218. FIG. 8 shows the relationship between the level of light $L_i$ incident upon liquid crystal cell 204 and the photoelectric current generated by solar cell array 218.

There are two basic methods available for controlling the voltage V applied to the electrodes of liquid crystal cell 204 in accordance with the voltage of a storage battery which is charged from solar cell 218. One method is to select a desired optimum value of storage battery voltage, such as level V0 in FIG. 7, and to increase or decrease V in proportion to any increase or decrease of the storage battery voltage with respect to this optimum voltage level. This represents a form of continuous control of voltage V. A second method is to designate an upper limit for the storage battery voltage, corresponding to the onset of an overcharged condition of the storage battery. With this method, when the battery voltage exceeds the upper limit, then a step increase of voltage V is performed, thereby causing the light control valve constituted by the liquid crystal cell to close almost completely. This is indicated by operating point N1 in FIG. 7, corresponding to voltage V1 being applied to the liquid crystal cell electrodes. Subsequently, when the storage battery voltage again falls below the upper limit value, the operating point is changed to almost completely open the light valve, as indicated by N2, corresponding to voltage V2 applied to the liquid crystal cell electrodes. The operating points for the case of a cell having a parallel or almost parallel orientation of the axes of polarization of the polarizing plates are shown by 02 and 01 respectively. With this second method, therefore, the control voltage applied to the liquid crystal cell terminals is varied in stepwise fashion, rather than in the continuous fashion of the first method described. The second method has the advantage of being somewhat more independent of the characteristics of individual solar cell chips.

Figure 9:
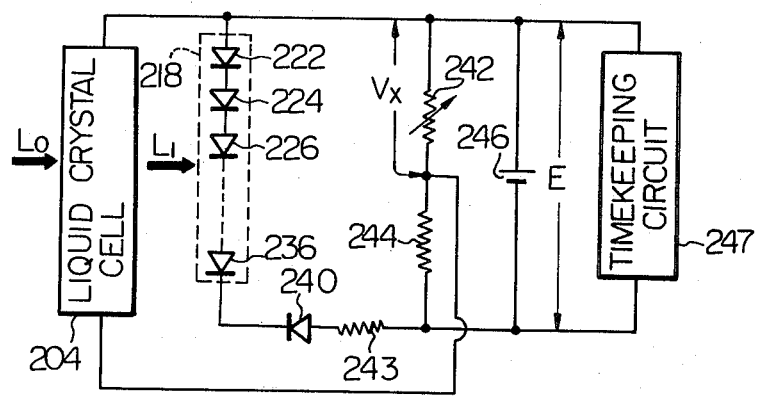
FIG. 9 is a general circuit diagram illustrating a third embodiment of the present invention, whereby a liquid crystal cell is used as a light control valve.

Referring now to FIG. 9, a third embodiment of the present invention, for control of the charging current of a storage battery by means of a light control valve is shown therein. The output voltage of storage battery 246 is applied to timekeeping circuits 247 and to a voltage divider comprising a fixed resistor 244 and a variable resistor 242. The value of resistor 242 is adjusted so that when the storage battery voltage is at a level corresponding to an optimum condition of charge, the voltage developed across variable resistor 242 is V0, shown in FIG. 7 above, for the particular solar cell array 218 which is utilized. Storage battery 246 is charged from solar cell array 218 through a circuit in which a reverse current prevention diode 240 and a current limiting resistor 243 are connected in series. When the voltage of storage battery 246 rises above or falls below the optimum charge level, then it is apparent that the voltage applied to the electrodes of liquid crystal cell 204 will increase or decrease accordingly, thereby causing a reduction of the charging current to battery 246 if the battery voltage is above the optimum level or an increase of the charging current if the battery voltage is below the optimum level.

Figure 10:
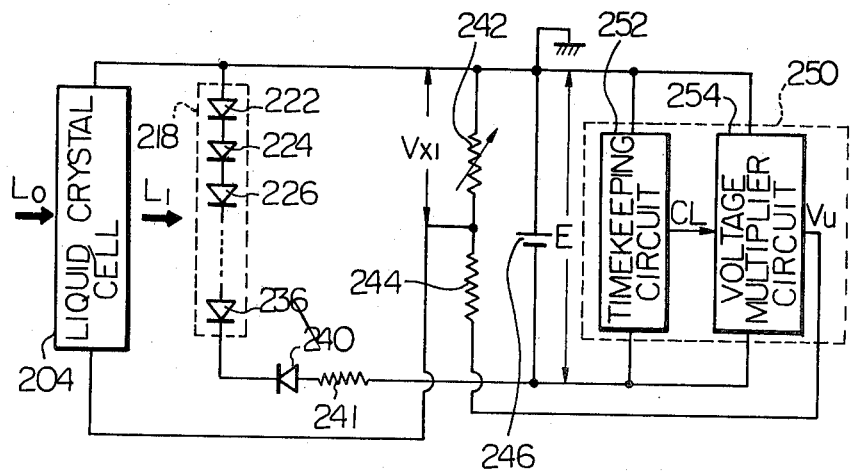
FIG. 10 is a general circuit diagram of a fourth embodiment of the present invention, whereby a liquid crystal cell is used as a light control valve controlled in accordance with the output of a voltage multiplier circuit.

The operation of the circuit shown in FIG. 10, which represents a fourth embodiment of the present invention, is similar to that of the circuit in FIG. 9, but in this case the voltage applied to the voltage divider consisting of fixed resistor 244 and variable resistor 242 is obtained from the output of a voltage multiplier circuit 254, which is driven by pulses supplied from timekeeping circuit 252.

Figure 11:
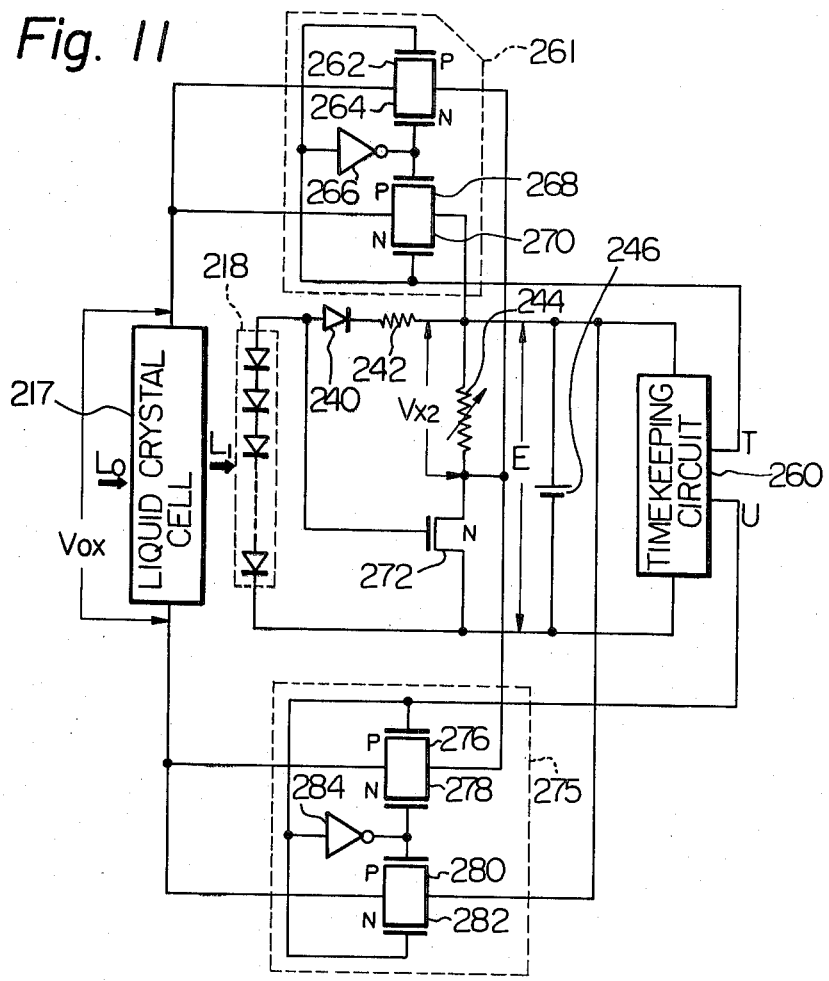
FIG. 11 is a general circuit diagram of a fifth embodiment of the present invention, whereby a liquid crystal cell is used as a light control valve, with an alternating control voltage being applied to electrodes thereof.
Figure 12:
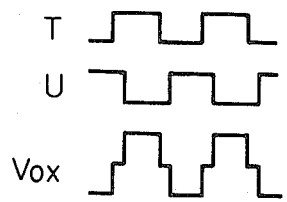
FIG. 12 is a waveform diagram for some of the signals generated in the circuit of FIG. 11.

Referring now to FIG. 11, a fifth embodiment of the present invention is shown therein, which consists of a timepiece controlled by a solar cell array 218. Switching pulses T and U having the waveform shown in FIG. 12 are generated by an intermediate stage of timekeeping circuit 260. Numeral 278 indicates an N channel transistor, the base of which is connected to one end of a series-connected solar cell array 218. When solar cell array 218 is exposed to a source of light, so that a light level L1 is transmitted through a liquid crystal cell 217 functioning as a light control valve, a photoelectric voltage is generated by solar cell array 218. This voltage biases the gate of N channel transistor 272 positively with respect to the drain terminal of the transistor, so that transistor 272 becomes conductive and presents a certain impedance between its drain and source terminals. The positive-going end of solar cell array 218 is also connected to a variable resistor 244, a storage battery 246, timekeeping circuit 260, and to source terminals of P; channel MOS transistors 268 and 280, and N channel MOS transistors 270 and 282. The other and of solar cell array 218 is connected to the drain terminal of N channel transistor 272, battery 246, and timekeeping circuit 260. The source terminals of P channel MOS transistors 276 and 262 and of N channel transistors 264 and 278 are connected to the source terminal of N channel transistor 272, which is also connected to the other end of variable resistor 244. A reverse voltage prevention diode 240 and a charging current limiting resistor 242 are connected in series with the positive-going output of solar cell array 218. Pulses T are applied to the gate terminals of P channel transistor 262 and the input of an inverter 266 and to the gate of N channel transistor 270. Pulses U are applied to the gate terminals of P channel transistor 276 and N channel transistor 282, and to the input of an inverter 284. The drain terminals of P channel transistors 262, 268, of N channel transistors 264, 270 are connected to one electrode of liquid crystal cell 217. The other electrode of liquid crystal cell 217 is connected to the drain terminals of P channel transistors 276 and 280, and N channel transistors 278 and 282.

The action of switching circuits 261 and 275 in response to switching pulses T and U causes the voltage appearing across variable resistor 244 to be applied alternately, with reversed polarity, across the electrodes of liquid crystal cell 217. This causes a voltage of the waveform indicated as Vox in FIG. 12 to appear across the terminals of liquid crystal cell 217. The peak-to-peak amplitude of voltage Vox is approximately equal to twice the amplitude of voltage V×2 appearing across the terminals of variable resistor 244.

With this embodiment, no power is dissipated in the voltage divider formed by variable resistor 264 and N channel transistor 272. If the solar cell array 218 is not exposed to illumination, then since no photoelectrice voltage will be generated to bias N channel transistor 272 into the conducting condition, no current will be drawn through variable resistor 244 and N channel transistor 272.

To perform initial setting of the circuit, the variable resistor 244 is adjusted, with N channel transistor 272 in the conducting condition and a voltage corresponding to the optimum charge voltage of storage battery 246 applied as voltage E shown in FIG. 11. Variable resistor 244 is adjusted so that the effective value of voltage Vox is equivalent to voltage V0 shown in FIG. 7 above, with respect to the characteristics of liquid crystal cell 217. Thereafter, control of the level of light L1 transmitted by liquid crystal cell 217 functioning as a light control valve is performed in a continuous fashion by means of voltage Vox. If battery voltage E should rise above the optimum charge level to approach a condition of overcharging, then the peak-to-peak amplitude of voltage Vox is increased, thereby reducing the level of light L1 transmitted through liquid crystal cell 217, and hence reducing the charging current supplied by solar cell array 218. If battery voltage E falls below the optimum charge level, to approach a condition of discharge, then the peak-to-peak amplitude of voltage Vox is decreased, thereby increasing the level of light L1 transmitted through liquid crystal cell 217, and hence increasing the charging current supplied by solar cell array 218. Thus, storage battery 246 is maintained at an optimum level of charge as determined by the preset value of variable resistor 244.

The method of controlling liquid crystal cell 217 by means of an alternating control voltage has the advantage of preventing a deterioration of the properties of the liquid crystal cell over a long period of time, which may be caused by a DC type of control voltage as utilized in the third and fourth embodiments described above.

Figure 13:
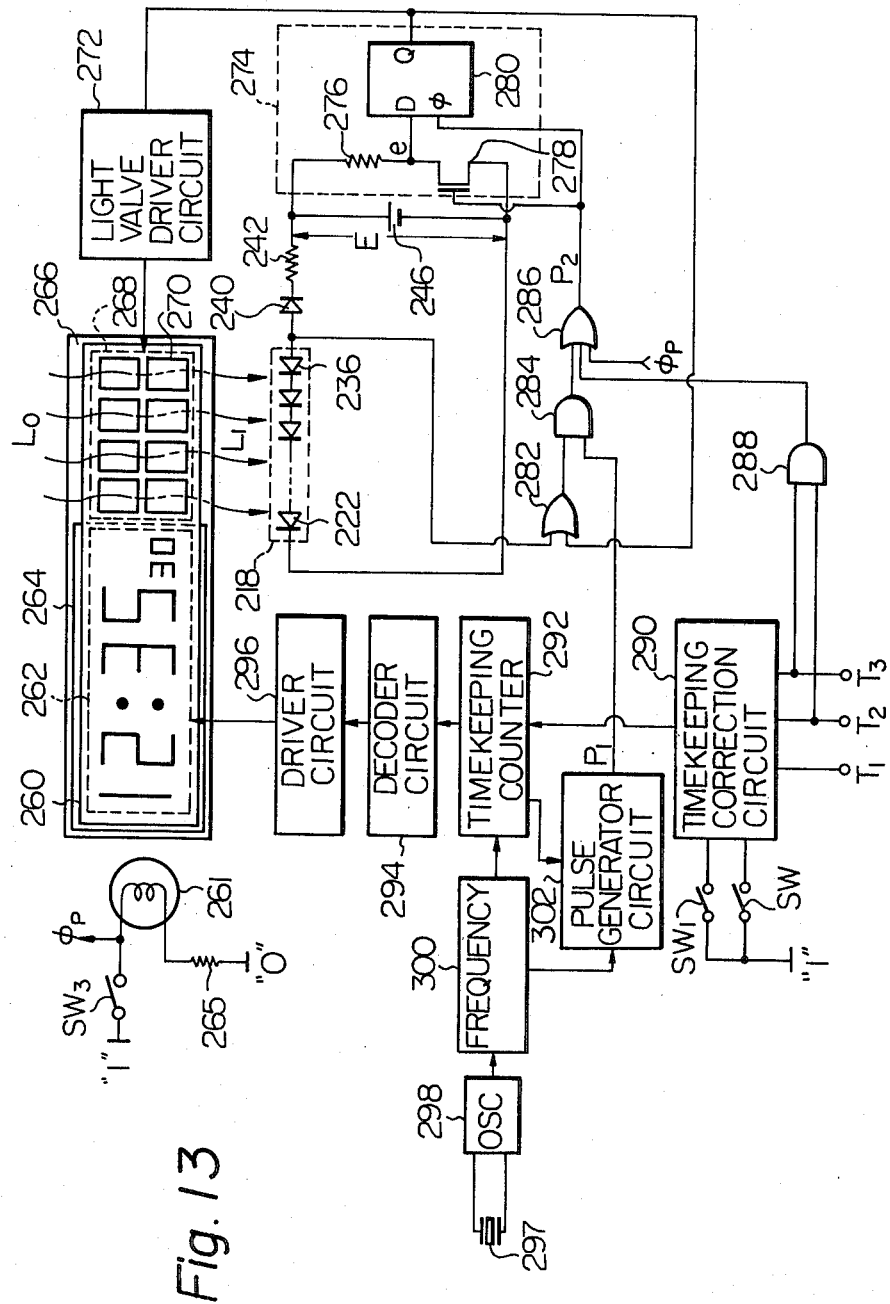
FIG. 13 is a general circuit diagram of a sixth embodiment of the present invention, whereby a light control valve is controlled by an output of a sample and hold circuit which periodically detects if the timepiece battery voltage is above a predetermined level.

Referring now to FIG. 13, a sixth embodiment of the present invention is shown therein. Numeral 260 indicates a liquid crystal cell having a timekeeping display section 262 and a light control valve section 268. A reflecting plate 266 is arranged beneath liquid crystal cell 260, containing apertures 270 through which light is passed to an array of solar cells 218 through light control valve section 268. Solar cell array 218 comprises a set of solar cell chips 222 to 236 connected in series. Numeral 261 indicates a lamp which can be turned on by depressing a switch SW3, thereby causing a current to flow through lamp 261 and a resistor 265 to illuminate timekeeping display section 262 of liquid crystal cell 260. A layer of transparent material such as acryl film is disposed between lamp 261 and time display section 262. This serves to ensure an even level of illumination of the display. A quartz crystal vibrator 297 is connected to an oscillator circuit 298 which produces an output signal at a frequency of 32768 Hz. This is applied to a frequency divider circuit 300, which produces an output signal at a frequency of 1 Hz. This is applied to a timekeeping counter 292 which counts the seconds, minutes and hours of time data. The output of timekeeping counter 292 is applied to a decoder circuit 294, the output of which is input to a driver circuit 296. Outputs from drive circuit 296 are applied to the electrodes of the time display section of liquid crystal cell 260 to display time information.

Intermediate stage outputs from frequency divider circuit 300 and timekeeping counter circuit 292 are applied to a pulse generator circuit 302 which produces signal P1. This consists of a train of pulses having a pulse width of 1/64 sec. and a period of from 1 to 5 minutes. Signal P1 is applied to an input of AND gate 284. The photoelectric voltage generated by solar cell array 218 is applied to one input of an OR gate 282, the output of a voltage detection circuit 274 (to be described later) being applied to another input of OR gate 282. The output of OR gate 282 is applied to AND gate 284, so that when said output is at the "1" logic level, pulses P1 are gated through AND gate 284, to be applied to an OR gate 286. Numeral 290 indicates a timekeeping correction circuit, to which inputs are applied from switches SW1 and SW2 and from test terminals T1, T2 and T3. The latter test terminals are provided for logic testing of the timekeeping circuits of the timepiece. Test terminal T2 and T3 are also connected to inputs of an AND gate 288, the output of which is applied to OR gate 286. The output of timekeeping correction circuit 290 is applied to timekeeping counter circuit 292 so that correction of time information can be performed by actuation of time correction switch SW1 and time correction selection switch SW2.

The photoelectric current generated by solar cell array 218 is passed through a reverse voltage blocking diode 240 and a charging current limiting resistor 242, to charge storage battery 246. Voltage E of storage battery 246 is applied to voltage detection circuit 274, which consists of a variable resistor 276, an N channel MOS transistor 278, and a data type flip-flop 280. Pulses P1 from pulse generating circuit 302 appear at the output of OR gate 286 as pulses P2. The amplitude of these pulses is close to that of the storage battery voltage E. If this amplitude is greater than the gate threshold voltage of N channel transistor 278, then a relatively low level of voltage e will be developed across the drain and source of N channel transistor 278 during pulse P2, since a voltage divider action is performed by variable resistor 276 and the ON impedance of transistor 278.

To perform initial adjustment of the voltage detection circuit, variable resistor 276 is set such that when the battery voltage corresponds to a state of overcharge of charge, voltage e is below the "1" logic level for flip-flop 280. Since pulse P2 is also applied to the clock terminal of flip-flop 280, a "0" logic level output will appear at the Q terminal of flip-flop 280. Thereafter, if the value of voltage E is below the predetermined value corresponding to the onset of a state of overcharge, then since the amplitude of the P2 pulses will be less than the threshold voltage of N channel transistor 278, the drain to source impedance of transistor 278 will be relatively high during the P2 pulses, so that a high value of voltage e will be developed. As a result, a "1" level output will appear at the Q output terminal of flip-flop 280. Thus, pulses P2 perform periodic sampling of the storage battery voltage E, and the result of this sampling operation is held by flip-flop 280, i.e. the voltage detection circuit 274 functions as a type of sample and hold circuit.

The output of voltage detection circuit 274 is connected to a driver circuit 272. When the output of circuit 274 is at the "0" logic level, corresponding to a state of overcharge of battery 246, then driver circuit 272 applies an alternating drive voltage to transparent electrodes of the light control valve section of liquid crystal cell 260. This causes the light control valve to close, thereby reducing the level of light, L1, illuminating solar cell array 218, and thereby reducing the charging current supplied by solar cell array 218 to almost zero. This condition will continue until the next P2 sampling pulse occurs. When voltage E of storage battery 246 again falls below the predetermined level, due to dissipation of power in the timekeeping circuits supplied by battery 246, then the output of voltage detection circuit 274 will go to the "1" logic level in response to the next P2 pulse to occur. As a result, driver circuit 272 will cease applying the alternating drive voltage to the electrodes of the light control valve section of liquid crystal cell 260, thereby causing the light control valve to open. Thus, the level of light falling upon solar cell array 218 is again increased, so that charging of the storage battery is resumed.

Thus, an overcharge condition of battery 246 is prevented, by the action of voltage detection circuit 274 performing periodic sampling of the battery voltage and controlling the level of light incident upon solar cell array 218 in accordance with the battery voltage.

Since the state of opening or closing of the light control valve section 268 is clearly visible to the user of the timepiece, the user is kept informed of the state of charge or discharge of the storage battery.

When the lamp illumination switch SW3 is depressed to illuminate the time display section 262, then, in the worst possible case, it is possible that the storage battery is in a relatively low state of charge but that the light control valve section 268 has not yet opened, due to the long time period between sampling pulses P2. Thus, application of the heavy load of lamp 261 to storage battery 246, could cause an excessive drop in battery voltage to occur before the next P2 pulse is generated. To prevent this, a signal $\phi_p$ at the "1" logic level is applied through OR gate 286, to perform the action of a P2 pulse and cause light valve section 268 to be opened, thereby enabling rapid charging of the storage battery to be performed by solar cell array 218.

In addition, during testing of the timekeeping circuits, the probes of a special integrated circuit tester are applied to test terminals T1, T2 and T3. To facilitate the test procedure by eliminating the long time period between pulses P2, the terminals T2 and T3 are both raised to the "1" logic level simultaneously by the tester, thereby producing a pulse from AND gate 288 which serves as a sampling pulse appearing at the output of OR gate 286.

A seventh embodiment of the present invention will now be described, referring to the general circuit diagrams of FIG. 14 and FIG. 15, and the corresponding waveform diagram of FIG. 16.

Figure 14:
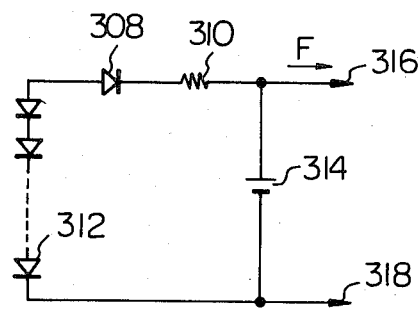
FIG. 14 and FIG. 15 are general circuit diagrams of a seventh embodiment of the present invention, whereby a storage battery charged from a solar cell array is discharged into a heavy load formed by the coil of a stepping motor, when a condition of overcharge is detected.
Figure 15:
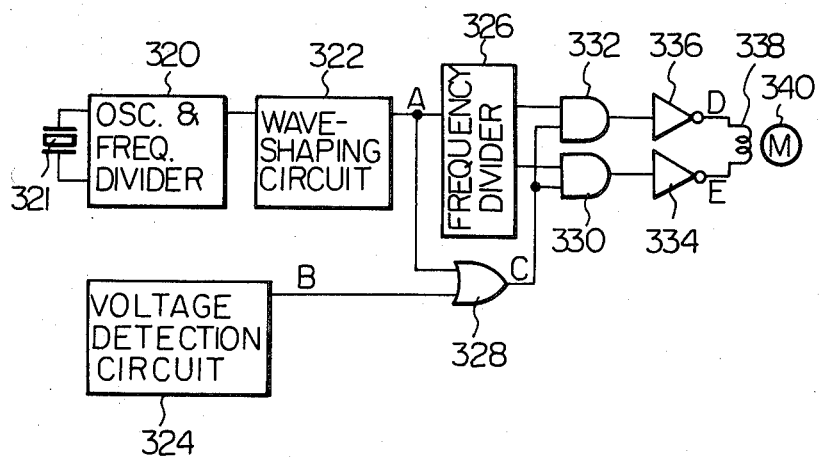

FIG. 14 shows a solar cell charging circuit for a timepiece powered by a storage battery, 314. The charging circuit consists of a solar cell array, 312, which passes a charging current to storage battery 314 through series-connected reverse voltage blocking diode and charging current limiting resistor 310. Terminals 316 and 318 of storage battery 314 are connected to the circuit shown in FIG. 14 for supplying power thereto. FIG. 15 shows the circuit of a timepiece which employs a stepping motor 340 to display time information by actuation of time indicating hands, which are not shown here. A quartz crystal vibrator 321 is connected to an oscillator and frequency divider circuit 320, to generate a standard frequency timekeeping signal as output. This signal is applied to a waveshaping circuit 322, which produces an output consisting of pulses having the waveform shown as A in FIG. 16. Pulses A have a period of ½ second and a pulse width of 7.8 milliseconds. These are applied to a ½ frequency divider circuit, designated by numeral 326, which produces two outputs 180° apart in phase, which are applied to a pair of AND gates 332 and 330.

Figure 16:
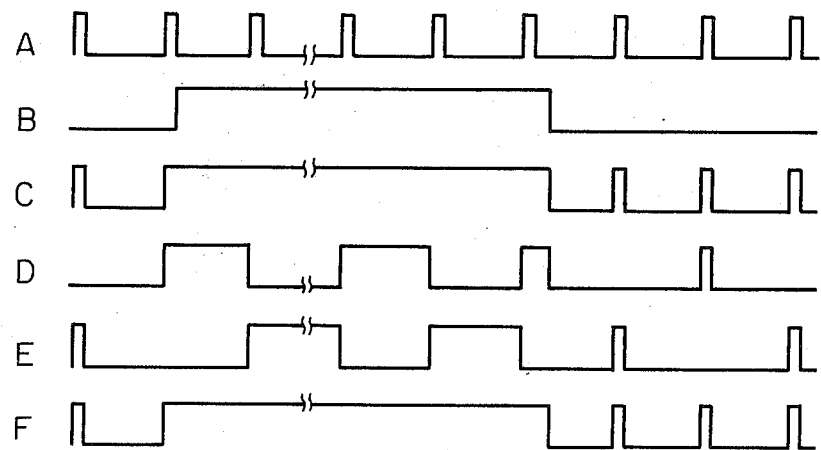
FIG. 16 is a waveform diagram for the circuit of FIGS. 14 and 15.

The voltage level of battery 314 is detected by a voltage detection circuit 324, which produces an output signal B, which is also shown in waveform diagram FIG. 16. If the voltage of storage battery 314 is below a predetermined level which indicates a state of overcharge of storage battery 314, then signal B remains at the "0" logic level. If the voltage of battery 314 should rise above the predetermined voltage level, due to exposure of solar cell array 213 to a strong source of illumination for a long period of time, causing overcharging of storage battery 314, then signal B goes to the "1" logic level, as shown in FIG. 16. Signal B is applied to an input of an OR gate 328, signal A from waveform shaping circuit 322 being applied to another input of this OR gate. The output of OR gate 328 is signal C, which has the waveform shown in FIG. 16. The outputs of AND gates 332 and 330 are applied to two current amplifying inverters 334 and 336, which produce drive signals D and E for application to the coil 338 of a stepping motor 340. Stepping motor 340 is driven thereby at a rate of once per second.

If the voltage of storage battery 314 is below the predetermined level, then since signal B is at the "0"

logic level, the outputs of ANd gates 332 and 330, and hence the outputs of current amplifying inverters 336 and 334, have a similar pulse width to signal A, as shown in FIG. 16. However, when a state of overcharge of battery 314 is detected by voltage detection circuit 324, then signal C goes to the "1" logic level, thereby increasing the duration of the ON periods of outputs D and E to almost ½ second. Thus, in effect, stepping motor 340 is being almost continuously driven, although at the same rate of stepping. This causes a heavy load to be placed upon battery 314. After battery 314 has been sufficiently discharged by this heavy load, its voltage will again fall below the predetermined level, and so output B of voltage detection circuit 324 will again return to the "0" logic level. This will then cause motor 340 to be driven by pulses D and E of very low duty cycle, so that only a light load is placed upon battery 314. Thus, even if the timepiece is exposed to a strong source of illumination for a long period of time, overcharging of the storage battery by solar cell array 312 is prevented.

The principle of this seventh embodiment of the present invention is basically similar to the first embodiment described above, wherein a lamp is used to provide a heavy load for discharging the storage battery when a condition of overcharge is detected.

What is claimed is:

1. A solar battery charging control system having a storage battery and a plurality of solar cells connected in series with said storage battery to charge said storage battery, comprising:
   detection means for detecting a battery charge level and generating an output signal when said battery charge level exceeds a predetermined value;
   a driver circuit for generating a drive signal responsive to said output signal; and
   heavy load means responsive to said drive signal to discharge said storage battery thereby preventing overcharging of said storage battery, said heavy load means discharging said battery for a predetermined interval of time, the duration of said predetermined interval of time being determined by said output signal from said detection means.

2. A solar cell battery charging control system according to claim 1, further comprising:
   circuit means for generating sampling signals to operate said detection means; and
   a memory circuit for memorizing the contents of the output signal from said detection means in response to said sampling signals, said heavy load means being controlled in response to an output signal from said memory circuit.

3. A solar cell battery charging control system according to claim 2, wherein said circuit means for generating sampling signals comprises means for generating a plurality of said sampling signals, and further comprising selection circuit means for selecting any one of said plurality of sampling signals responsive to at least one output signal of said detection means, said selected sampling signal being applied to said detection means.

4. A solar cell battery charging control system having a storage battery, and a plurality of solar cells connected in series for charging said storage battery, comprising:
   detection means for detecting a battery charge level and generating an output signal when said battery charge level exceeds a predetermined value; and
   a liquid crystal cell functioning as a light control valve to control a level of light incident upon at least one of said plurality of solar cells responsive to said output signal.

5. A solar cell battery charging control system according to claim 4, wherein said detection means comprises at least two resistors connected in series between terminals of said storage battery, a junction of said resistors being connected to one electrode of said liquid crystal cell and a terminal of said storage battery being connected to another electrode of said liquid crystal cell.

6. A solar cell battery charging control system according to claims 4 or 5, wherein said detection means comprises:
   an MOS transistor connected in series with a variable resistor, a control terminal of said transistor being connected to said plurality of solar cells whereby the impedance of said transistor is controlled responsive to a photoelectric voltage generated by said plurality of solar cells;
   oscillator means for generating switching signals;
   switching means responsive to said switching signals for applying an alternating control voltage to electrodes of said liquid crystal cell, the amplitude of said alternating control voltage being proportional to the amplitude of a voltage developed across said variable resistor.

7. A solar cell battery charging control system according to claims 4 or 5, in which said liquid crystal cell controls a level of light incident on at least one of said plurality of solar cells for a predetermined period of time, responsive to said output signal.

8. A solar cell battery charging control system according to claim 7, further comprising:
   circuit means for generating sampling signals for operating said detection means; and
   a memory circuit for memorizing the contents of an output signal from said detection means in response to said sampling signals, said liquid crystal cell being controlled in response to an output signal from said memory circuit.

* * * * *